United States Patent [19]

Sato et al.

[11] Patent Number: 5,867,628
[45] Date of Patent: Feb. 2, 1999

[54] RECORDING METHOD OF STILL VIDEO APPARATUS

[75] Inventors: Yoshiaki Sato; Yoshio Wakui; Kimiaki Ogawa, all of Tokyo, Japan

[73] Assignee: Asahi Kogaku Kogyo Kabushiki Kaisha, Tokyo, Japan

[21] Appl. No.: 295,035

[22] Filed: Aug. 25, 1994

Related U.S. Application Data

[63] Continuation of Ser. No. 183,901, Jan. 21, 1994, abandoned, which is a continuation of Ser. No. 791,202, Nov. 13, 1991, abandoned.

[30] Foreign Application Priority Data

Nov. 14, 1990 [JP] Japan .................................. 2-306019

[51] Int. Cl.$^6$ ...................................................... H04N 5/91
[52] U.S. Cl. .............................. 386/106; 386/96; 386/121
[58] Field of Search ................................ 360/35.1, 33.1; 358/341, 342, 906, 909; 386/96, 98, 102, 106, 117, 121

[56] References Cited

U.S. PATENT DOCUMENTS

| | | | |
|---|---|---|---|
| 4,858,031 | 8/1989 | Fukuta | 358/342 |
| 4,931,878 | 6/1990 | Takei et al. | 358/335 |
| 4,959,735 | 9/1990 | Kawai | 358/342 |
| 5,047,869 | 9/1991 | Aoki et al. | 358/341 |
| 5,339,199 | 8/1994 | Ogawa | 360/35.1 |

FOREIGN PATENT DOCUMENTS

| | | |
|---|---|---|
| 0127033 | 12/1984 | European Pat. Off. . |
| 0186883 | 7/1986 | European Pat. Off. . |
| 0223423 | 5/1987 | European Pat. Off. . |
| 0379444 | 7/1990 | European Pat. Off. . |
| 0444511 | 2/1991 | European Pat. Off. . |
| 0444512 | 9/1991 | European Pat. Off. . |
| 3930635 | 3/1990 | Germany . |
| 3933155 | 4/1990 | Germany . |
| 3933186 | 4/1990 | Germany . |
| 4002991 | 8/1990 | Germany . |
| 53-135254 | 11/1978 | Japan . |
| 63-255871 | 10/1988 | Japan . |
| 1123581 | 6/1989 | Japan . |
| 0202782 | 8/1990 | Japan . |
| 2223645 | 4/1990 | United Kingdom . |
| 2229061 | 9/1990 | United Kingdom . |
| 2235605 | 3/1991 | United Kingdom . |
| 2235846 | 3/1991 | United Kingdom . |
| 2240238 | 7/1991 | United Kingdom . |

OTHER PUBLICATIONS

English Language Abstracts of Japanese Applications 63–255871 and 53–135254.
United Kingdom Serch Report.
Kaisert, P., "Fotos anf Floppies" Published in: Funkschau, issue 25/1988, pp. 40 to 42.
"Still Video—Still Here?" published on pp. 873–876 of the Oct., 1990 issue of Electronics World + Wireless World.

*Primary Examiner*—Andrew L. Sniezek
*Attorney, Agent, or Firm*—Greenblum & Bernstein, P.L.C.

[57] ABSTRACT

An electronic still video apparatus in which, when an image releasing operation is effected, image signals are picked up and recorded on a recording medium, and when a sound receipt operation starts, sound signals are received for a predetermined period of time, so that the received sound signals are recorded on the recording medium when a sound releasing operation is effected. The electronic still video apparatus has an AV record mode in which the image signals and the sound signals are recorded on the recording medium in corresponding fashion. The image signals are recorded prior to the recording of the sound signals, regardless of the receipt of the sound signals in the AV record mode when the image release operation is effected.

5 Claims, 11 Drawing Sheets

FIG. 7    Standby state    → State effected by a next switch 5-1

5-2

5-3

5-4

☐ : Magnetic head    Ⓥ : Image recording    Ⓐ : Sound recording

①~⑤ : Track

RECORDING METHOD OF STILL VIDEO APPARATUS

This application is a continuation of application Ser. No. 08/183,901, filed Jan. 21, 1994, now abandoned, which is a continuation of application Ser. No. 07/791,202, filed Nov. 13, 1991, now abandoned.

BACKGROUND OF THE INVENTION

1. Field of the Invention

The present invention relates to an apparatus for recording and reproducing a still image from, for example, a still video camera, and more precisely, it relates to a recording method of a i.e., still video apparatus (still image recording and play-back apparatus) in which sound signals can be recorded and reproduced.

2. Description of Related Art

In a still video apparatus, a unit of one or two recording tracks, out of a plurality of recording tracks provided on a magnetic disc, forms one field picture plane or one frame picture plane. In a still video apparatus in which sound signals can be recorded, a sound lasting from 5 to 20 seconds can be recorded on one track. Since one turn of the magnetic disc corresponds to one field of the image signal (about 1/60 second in the case of an NTSC system), upon recording, sound signals to be recorded within a predetermined time are first stored in a memory means, and then, the time base of the stored sound signals are compressed so that they may be read and recorded on the magnetic disc. Accordingly, a known still video apparatus is usually provided with an image release switch which is actuated to record a picture, a sound collecting switch which is actuated to store a sound in the memory means, and a sound release switch which is actuated to record the stored sound onto the magnetic disc.

In a recent still video apparatus, a recording system in which the image signals and the sound signals are recorded in a corresponding fashion has been adopted, which system will be referred to hereinafter as an AV (Audio-Visual) mode. In this AV mode type of recording lo system, for example, the tracks of the magnetic disc for the image signals and the sound signals are preset, so that when the image signals or the sound signals are recorded, data signals including the corresponding sound signals or image signals and discrimination marks which differentiate the presence of the corresponding image signals or sound signals, are recorded on the respective tracks. Upon reproducing the sound and image signals, the discrimination marks are reproduced to carry out the necessary operations in accordance with the reproduced discrimination marks. The data signals are subject to DPSK modulation and overlapped on the image signals so as to be recorded together.

In a known first recording method in the AV mode, first the storage of the sound signals in the memory means commences, and when the image release switch is actuated during the storage of the sound signals, the image signals are recorded. When the storage of the sound signals is complete, the stored sound signals are recorded.

In a known second recording method in the AV mode, when the image release switch is actuated, the image signals are first recorded, and thereafter, the storage of the sound signals automatically begins. When the storage of the sound signals is complete, the stored sound signals are automatically recorded.

However, in the first recording method, since the image signals are recorded during the storage of the sound signals, sounds produced when the diaphragm or shutter are driven upon operation of the image release switch may be recorded as noise, or the sound signals can be deteriorated by a fluctuation of the sound signal level due to a voltage drop caused by the commencement of the magnetic disc rotation or the emission of strobe light.

In the second recording method, since the sound signals are automatically recorded after the image signals are recorded, undesirable sound may be recorded, or conversely, desirable sounds may not be recorded.

Furthermore, in both the first and second recording methods, since the sound signals are recorded to correspond to the recorded image signals in the AV mode, in order to stop the recording of the sound signals after the completion of the recording of the image signals, it is necessary to actuate a mode selection switch to switch to the AV mode. To this end, to continuously record the image signals without temporarily recording the sound signals in the AV mode, the mode selection switch must be troublesomely actuated.

In addition to the foregoing, in the known recording methods mentioned above, after-recording in which the sound is recorded after the picture is recorded in the AV mode without changing the mode cannot be effected. Accordingly, it is necessary to record only the image signals in the normal mode, and then record the sound signals on the tracks of the corresponding image signals. This is troublesome.

The primary object of the present invention is to provide a recording apparatus and method which can eliminate the above mentioned drawbacks of the prior art.

SUMMARY OF THE INVENTION

To achieve the object mentioned above, according to the basic concept of the present invention, if the image release operation is effected in the AV record mode during the receipt of the sound signals, the receipt of the sound signals is stopped and the image signals picked-up by the image release operation are recorded. The sound signals received up until the image release operation are then recorded on the recording medium.

If the image release operation is effected without receiving the sound signals, the image signals are recorded and the mode is transferred to the sound receipt waiting (standby) mode, in which the control waits for the sound release in the AV record mode. If the sound release operation is effected while in the waiting mode, the received sound signals are recorded on the area of the recording medium corresponding to the area in which the image signals are recorded.

If the image release operation is effected while in the waiting mode without effecting the sound release operation, the sound signals are not recorded on the area corresponding to the image signals recorded immediately before the transfer to the waiting mode. In this case, the image signals can be recorded on the adjacent area, so that the mode is transferred to the waiting mode.

If, an operation other than the sound release operation or the image release operation is effected while in the waiting mode, the sound signals preferably are not recorded on the area corresponding to the recorded image signals and the waiting mode is released.

According to the present invention, since the sound signals received before the image release operation are recorded to correspond to the image signals, the sound signals are free from adverse influence caused upon image releasing.

Furthermore, since the mode is automatically transferred to the sound receipt waiting mode when the image release operation is effected before the sound signals are received, an operator can record the necessary sound signals any time after the image signals are recorded without modifying the mode (so-called "after-recording").

On the other hand, if the image release operation is effected while in the sound receipt waiting mode, the image signals are recorded on the next image recording area, and thereafter, the mode is again returned to the waiting mode. If another operation is effected, the waiting mode is automatically released. Accordingly, a mode change operation is not necessary.

The present disclosure relates to subject matter contained in Japanese patent application No. HEI 02-306019 (filed on Nov. 14, 1990), which is expressly incorporated herein by reference in its entirety.

BRIEF DESCRIPTION OF THE DRAWINGS

Below, a detailed explanation will be made of the present invention based on embodiments shown in the attached drawings, in which.

DESCRIPTION OF THE PREFERRED EMBODIMENTS

Figure 1:
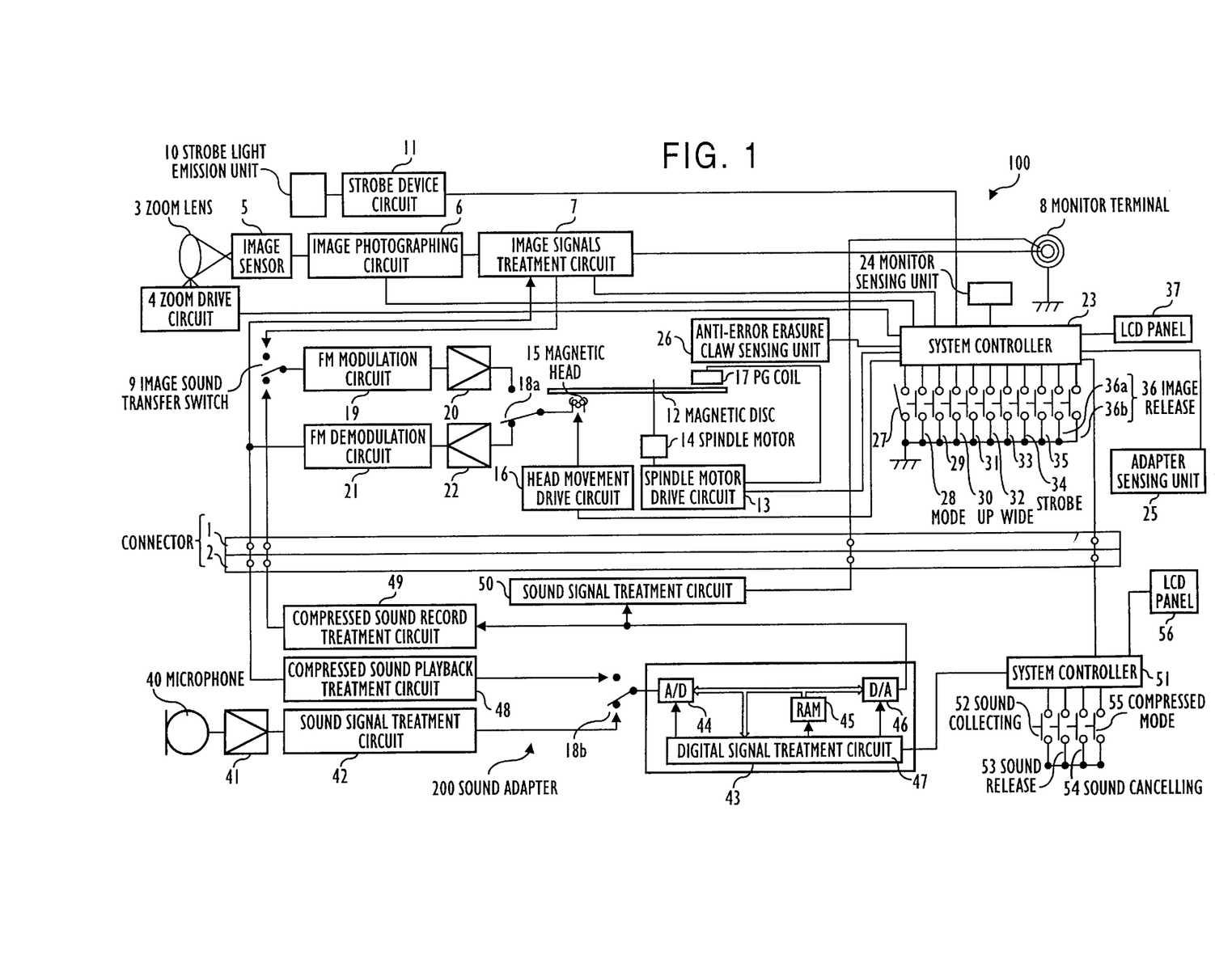
FIG. 1 is a block diagram of an internal circuit of a still video camera to which the present invention is applied, by way of example.

The invention will be discussed below with reference to FIG. 1 which shows a block diagram of an internal circuit of a still video camera according to the present invention. The still video camera has a camera body 100 and a sound adaptor 200 that is detachably attached to the camera body 100. The camera body 100 and the sound adaptor 200 are electrically connected to each other by connectors 1 and 2.

The camera body 100 has a zoom lens 3 driven by a zoom drive circuit 4. An image of an object to be taken is formed on an image sensor 5 by the zoom lens 3 and is converted to electrical signals to be outputted as image pickup signals from an image pickup circuit 6. The image pickup signals are subject to the necessary treatments, such as the addition of synchronous signals by an image signal processing circuit 7, to obtain image signals (video signals). The video signals are inputted to monitor terminal 8, and an FM modulation circuit 19 through an image/sound selection switch 9 provided on the camera body 100. The camera body 100 includes a strobe light emitting portion 10, which emits an auxiliary light upon taking a picture and a strobe light control circuit 11 which controls the emission of the strobe light.

A magnetic disc 12 is used as a recording medium and is loaded in the camera body 100 to record image signals and the sound signals. The magnetic disc 12 is rotated at a constant speed (e.g., 3600 rpm) by a spindle motor 14 that is controlled by a spindle motor driving circuit 13. A magnetic head 15 opposed to the magnetic disc 12 is moved in a radial direction by an actuator (not shown). The magnetic head 15 is moved in the radial direction until it reaches a predetermined track, which is defined as one of a plurality of concentric tracks (e.g., 50 tracks) formed (formated) on the magnetic disc 12 in accordance with the control of a head driving circuit 16. A PG coil 17 is provided to generate pulses to detect a fluctuation in the revolutions per second of the magnetic disc 12, thereby keeping the speed constant. The output of the PG coil 17 is fed back to the spindle motor driving circuit 13 so that the latter detects a phase difference between the PG pulses generated by the PG coil 17 and a reference pulse, thereby controlling the rotational speed of the magnetic disc 12.

The magnetic head 15 is connected to either a modulation side, comprising an FM modulation circuit 19 and an amplifier circuit 20, or a demodulation side, comprising an FM demodulation circuit 21 and an amplifier circuit 22 depending on the position of a record/play-back selection switch 18a. On the modulation side, either the image signals or sound signals are inputted through the image/sound selection switch 9, depending on the position of the switch, from either the image signal processing circuit 7 or the sound adaptor 200, respectively. The signals inputted through the selection switch 9 are then FM-modulated and amplified to be fed to the magnetic head 15. The magnetic head 15 records the FM-modulated image signals or sound signals on the magnetic disc 12. Conversely, on the demodulation side, the FM-modulated image signals and sound signals recorded on the magnetic disc 12 and read by the magnetic head 15 are amplified and demodulated to be sent to the image signal processing circuit 7 and the sound adaptor 200, respectively.

The zoom circuit 4, the image pickup circuit 6, the image signal processing circuit 7, the strobe control circuit 11, the spindle motor driving circuit 13 and the head driving circuit 16 are controlled by a system controller 23. To the system controller 23 are connected a monitor detector 24 which detects whether a monitor (not shown) is connected to the monitor terminal 8, an adaptor detector 25 which detects whether the sound adaptor 200 is mounted to the camera body 100, and a notch detector 26 which detects the presence of a write-prevent notch which is used for preventing the recorded data of the magnetic disc 12 from being erased by mistake. The outputs of detectors 24, 25 and 26 are inputted to the system controller 23.

Furthermore, various switches 27, 28, 29, 30, 31, 32, 33, 34, 35, 36a and 36b are connected to the system controller 23, so that when these switches are turned ON or OFF, appropriate operations are carried out. Battery switch 27 is turned ON and OFF to supply the system controller with power and stop the power supply, respectively (a battery which is used to power the system controller is not shown). Mode switch 28 selects either an image pickup mode or a recording mode. Selection switch 29 selects a sub-mode of the selected image pickup mode or recording mode. Up switch 30 and down switch 31 are actuated to increase or decrease the indicated value, for example, the track number, whereby the magnetic head 15 is moved. Telephoto switch 32 and the wide angle switch 33 actuate the zoom drive circuit 4 to perform a power zooming operation in the direction of the telephoto direction or the wide angle direction, respectively. Strobe switch 34 sets a light emission mode in which strobe light is emitted, and EF switch 35 selects an exposure correction mode in which an exposure correction value is set.

Photometer switch 36a and the image release switch 36b are actuated in association with image release button 36 provided on the upper surface of the camera body 100, so that when the image release button 36 is depressed by a half step or a full step, either the photometer switch 36a or the image release switch 36b are turned ON, respectively.

The system controller 23 controls the LCD panel 37 provided on the surface of the camera body 100.

In the sound adaptor 200, the sound received and converted to electrical signals by a microphone 40 are amplified by amplifier circuit 41 and subjected to necessary treatments, including restriction of the bandwidth and removal of the noise, etc., by a sound treatment circuit 42 to form sound signals. The sound signals to be recorded are inputted to a sound signal storing portion 43 through a record/play-back selection switch 18b, which is controlled by a system controller 51. The record/play-back selection switch 18a of the camera body 100 is controlled by the system controller 23.

The sound signal storing portion 43 includes an A/D converter circuit 44 which converts the inputted sound signal to digital signals, a RAM 45 which successively memorizes the digital signals, a D/A converter circuit 46 which successively reads the digital signals memorized in the RAM 45 and converts them to analogue signals, and a digital signal processing circuit (CPU) 47 which controls the operations of the devices or circuits mentioned above. The A/D converter circuit 44 samples and performs the quantization of the analogue sound signals inputted thereto and converts them to digital signals.

The D/A converter circuit 46 successively converts the digital sound signals read from the RAM 45 into analogue sound signals. The digital signal processing circuit 47 successively stores the digital sound signals converted by the sound signal storing portion 43 in the RAM 45 upon receiving the sound, and successively reads the digital sound signals stored in the sound signal storing portion 43 in a predetermined compressed (contracted) time (e.g., about 1/60 second), so that the digital sound signals are converted to analogue sound signals by the D/A converter circuit 46, upon recording, respectively. Thus, the time base of the sound signals of, for example, 5, 10 or 20 seconds are compressed to about 1/60 second.

Either the sound signals received by the microphone 40 or the FM modulation signals inputted to the camera body 100 and modulated by sound signal compressing and reproducing circuit 48 are inputted to the sound signal storing portion 43, depending on the position of the record/play-back selection switch 18b. The output of the sound signal storing portion 43 is sent to a compressed sound recording and processing circuit 49 and a sound signal processing circuit 50. The sound signals outputted from the compressed sound recording and processing circuit 49 are inputted to the camera body 100 and the modulation side (FM modulation circuit 19) through the image/sound selection switch 9. The sound signals outputted from the sound signal processing circuit 50 are inputted to the camera body 100 to be output from the monitor terminal 8. The sound signal compressing and reproducing circuit 48 performs the necessary operations, such as deemphasizing of the sound signals with the compressed time base read from the magnetic disc 12, and the compressed sound recording and processing circuit 49 performs the necessary operations, such as preemphasizing of the sound signals with the compressed time base read from the RAM 45.

The digital signal processing circuit 47 of the sound signal storing portion 43 is controlled by a system controller 51. Various switches 52, 53, 54 and 55 are connected to the system controller 51, so that the latter can perform the necessary operations when these switches are turned ON and OFF. When sound receipt starting switch 52 is actuated, sound is received by the microphone 40 and provisionally stored in the RAM 45. Sound release switch 53 is actuated to read the sound signals stored in the RAM 45 and record the same on the magnetic disc 12 of the camera body 100. Sound receipt canceling switch 54 erases the sound signals stored in the RAM 45. The recording time changing switch 55 switches the sound compressing mode to change the recording time and can selectively set a 10 second mode or a 20 second mode as in the illustrated embodiment.

The system controller 51 controls the indication of LCD panel 56 that is provided on the surface of the sound adaptor 200.

Figure 2:
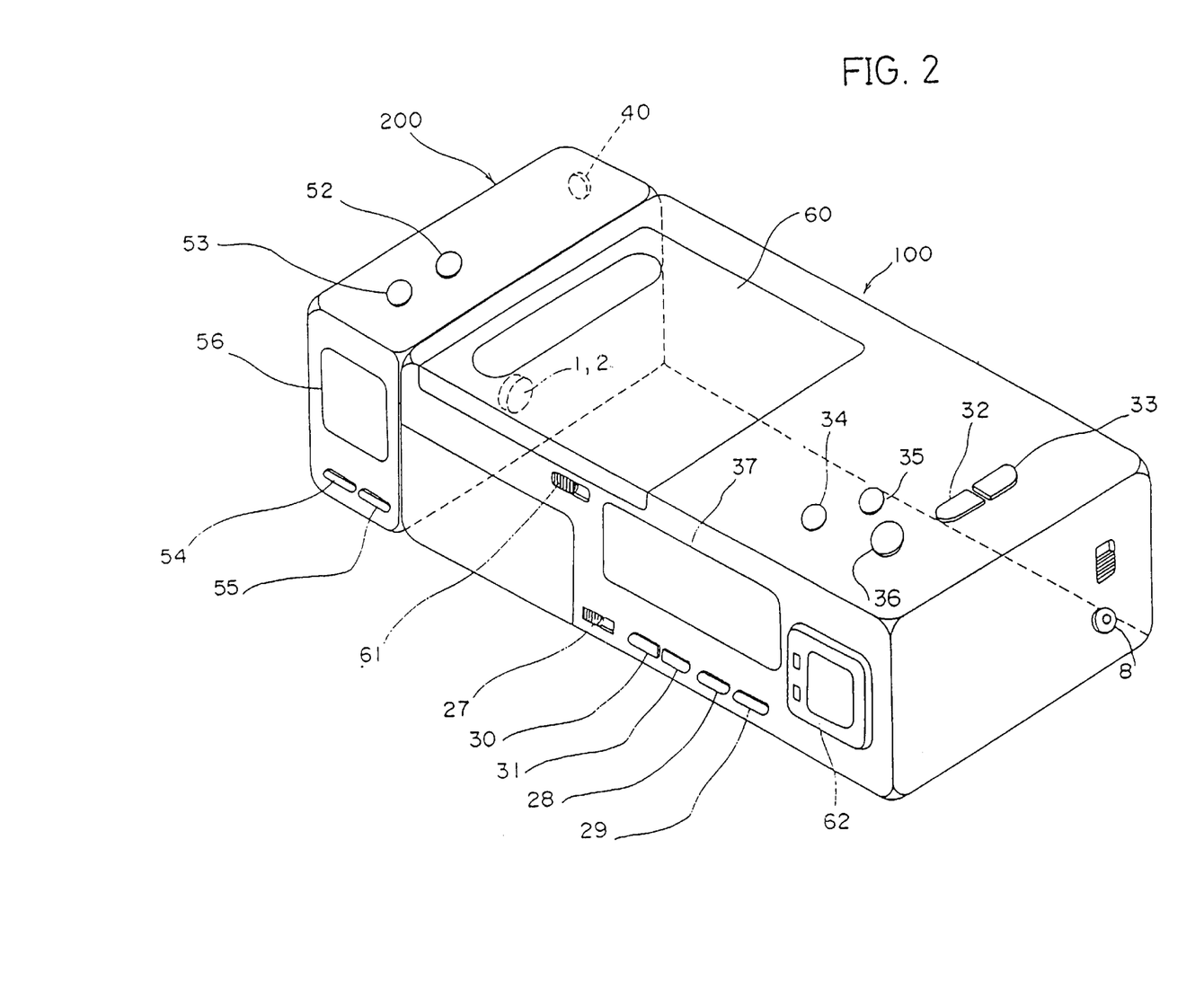
FIG. 2 is a perspective view of a still video camera shown in FIG. 1 as viewed from behind.

FIG. 2 shows the camera body 100 and the sound adaptor 200 as constructed above. The camera body 100 has a protective cover 60, which protects the magnetic disc. The magnetic disc 12 can be loaded and unloaded with the protective cover 60 in place. Numerals 61 and 62 designate an ejection button which opens the protective cover 60 to load and unload the magnetic disc and a finder (eyepiece side of finder), respectively.

Figure 3A:
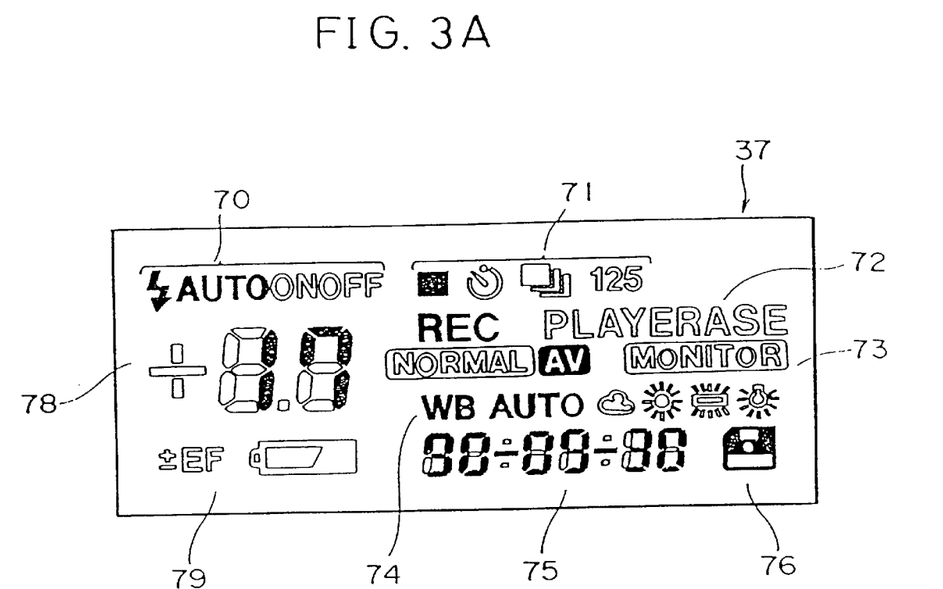
FIGS. 3A and 3B are front elevational views of display surfaces of LCD panels provided in a camera body and a sound adaptor, respectively.

FIG. 3A shows the indication of the LCD panel 37 provided on the camera body 100, by way of example. Numeral 70 designates the strobe light emission mode indicating portion which indicates three modes of automatic emission. From the left to right these modes are (AUTO), compulsory emission (ON), and no emission (OFF). Picture taking mode indicating portion 71 next to the strobe light emission mode indicating portion 70 indicates a single mode, a self-timer mode, a continuous 1-shot mode (one picture per second), a continuous 2-shot mode (two pictures per second), and a continuous 5-shot mode (five pictures per second), located in this order from left to right. The line directly below the picture taking mode indicating portion 71 is an operation mode indicating portion 72 which indicates a record mode (REC), a play-back mode (PLAY) and an erasing mode (ERASE), located in this order from the left. The line directly below the operation mode indicating portion 72 is a mode indicating portion 73 which indicates a normal mode (NORMAL) in which only the picture is recorded, an AV mode (AV) in which both the picture and the sound are recorded, and a monitor mode (MONITOR) in which only the play-back is effected, located in this order from left to right.

The line directly below the mode indicating portion 73 is a WB mode indicating portion 74 which indicates a white balance mode (WB), an auto mode (AUTO), a cloud balance mode, a fine balance mode, a fluorescent lamp balance mode, and an incandescent lamp balance mode, located in this order from left to right.

Below the WB mode indicating portion 74 is provided a calendar indicating portion 75 which indicates year-month-day and hour-minute-second. A symbol next to the calendar indicating portion 75 is a magnetic disc indicating portion 76 which indicates whether the magnetic disc is loaded. Mathematical symbols and numerals below the light emission indicating portion 70 form a data indicating portion 78 which indicate the track number and exposure correction value, etc. A warning indicating portion 79 below the data indicating portion 78 indicates whether the exposure correction value is set and whether the battery power is sufficient.

Figure 3B:
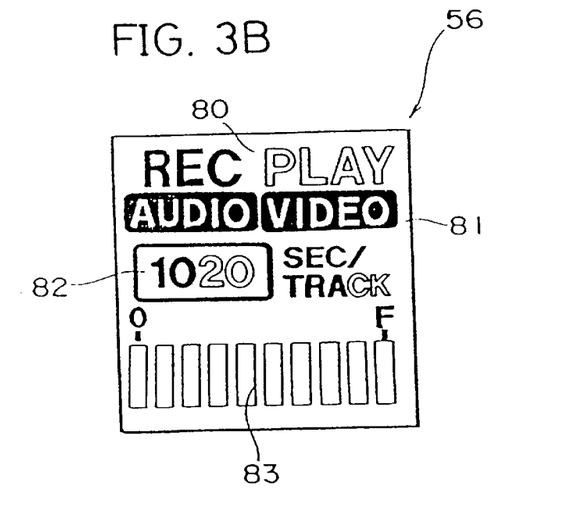

FIG. 3B shows an indication of the LCD panel 56 provided on the sound adaptor 200 by way of example. The uppermost line is an operation mode indicating portion 80 which indicates a record mode (REC) and a play-back mode (PLAY). The line below the operation mode indicating portion 80 is a recording subject indicating portion 81 which indicates that the subject to be recorded is either sound (AUDIO) or image (VIDEO). A sound recording time indicating portion 82 located below the recording subject indicating portion 81 indicates the maximum recording time for which the sound can be recorded, i.e., a 10 second mode (10) or a 20 second mode (20). Bar codes located below the sound recording time indicating portion 82 denote a recording state indicating portion 83. The individual bar codes are successively lit to indicate the time which has elapsed from the commencement of a sound recording operation.

Figure 8A:
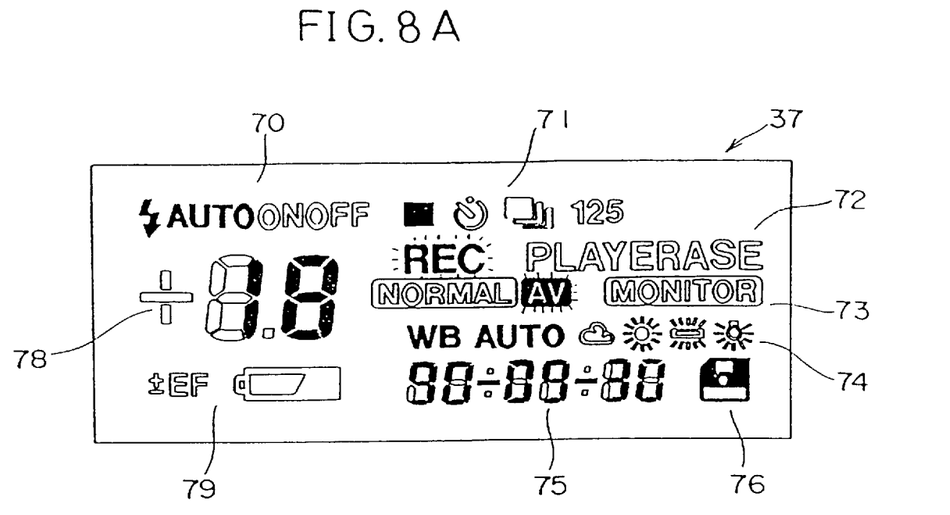
Figure 8B:
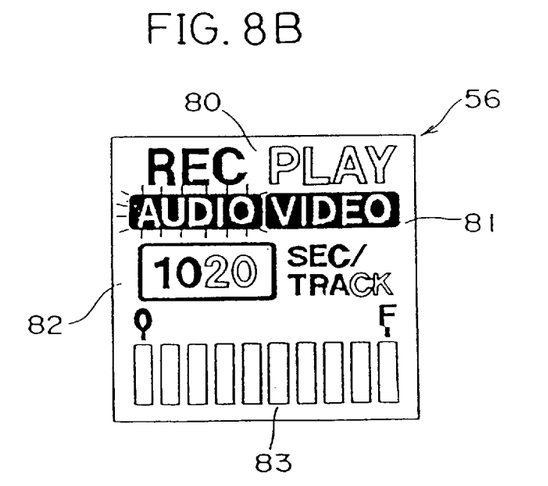

FIGS. 8A and 8B show example indications of the LCD panels 37 and 56 in a waiting mode, according to the present invention. In FIGS. 8A and 8B, the white portions denote no indication and the black portions denote the effective indications. The letters surrounded by the black radial lines mean that the indication light is blinking. For example, "REC" and "AV" in FIG. 8A, and "AUDIO" in FIG. 8B are illustrated as a blinking light.

The following discussion will be addressed to the normal mode and the AV mode of the still video camera according to the present invention.

Normal Mode

In this mode, the sound signals and image signals are independently recorded and reproduced. For instance, when the release button 36 (release switches 36a and 36b) is turned ON, the image signals are recorded on the magnetic disc 12. Control signals which are recorded simultaneously with the image signals, indicate, upon play-back of the track, whether or not the image signal is recorded independently of the sound signal. In the AV mode the control signals include data corresponding to both image signals and the track numbers of the sound signals. The control signals are subjected to DPSK (Dual Phase Shift Keying) modulation and are superimposed and recorded on the FM-modulated image signals. The data of the control signals is controlled by the system controller 23 and is modulated and demodulated by circuits (not shown), and is decoded by the system controller 23.

When the sound receiving switch 52 is turned ON, the sound signals are stored in the RAM 45. Thereafter, when the sound release switch 53 is turned ON, the sound signals stored in the RAM 45 are recorded on the magnetic disc 12. An information signal which is recorded simultaneously with the sound signals indicates whether or not the sound signals are separately recorded. In the normal mode of the illustrated embodiment, the sound signals and the image signals can be recorded on optional tracks.

AV Mode

The AV mode is a mode in which the sound signals and the image signals are recorded and reproduced in association with each other. Namely, the sound signals and the image signals are recorded on adjacent tracks of the magnetic disc 12, respectively, and reproduced with a certain relationship therebetween. Upon recording, the data which represent the sound signals and the image signals are recorded in the respective data portions.

The main operation of the still video camera is as follows. The main operation is controlled and carried out by the system controllers 23 and 51. Each of the system controllers 23 and 51 is usually comprised of a microcomputer and is performed in accordance with a program stored in an internal ROM of the microcomputer.

Recording and Play-Back at Normal Mode

When the normal mode is selected, the following operation is effected and controlled by the system controllers 23 and 51.

N1: Recording of Image

When the image release button 36 is depressed to turn the photometering switch 36a ON, the metering of an object distance, the calculation of the exposure, and the automatic focus adjustment, etc. are performed.

Furthermore, when the image release button 36 is fully depressed to turn the image release switch 36b ON, the shutter is opened, so that an object image is formed on the image sensor 5 by the zoom lens 3. The image pickup signals converted to electrical signals by the image sensor 5 are recorded on the magnetic disc 12 as FM modulation signals through the image pickup circuit 6, the image signal processing circuit 7, the FM modulation circuit 19, the amplifier circuit 20, the record/play-back selection switch 18a, and the magnetic head 15.

On the other hand, when the photometer switch 36a is turned ON, the spindle motor 14 is driven by the spindle motor driving circuit 13 to rotate the magnetic disc 12 at a constant speed. When the magnetic head 15 is moved to a predetermined track through the head driving circuit 16, the image signals for one field are recorded on the associated track by the magnetic head 15. Upon recording the image signals, the DPSK-modulated information signals are superimposed and recorded on the FM-modulated image signals of the same track.

N2: Recording of Sound Signals in the Normal Mode

When the sound receipt starting switch 52 of the sound adaptor 200 is actuated, the sound signals within a predetermined time (10 or 20 seconds in the illustrated embodiment) are recorded in the RAM 45. The sound signals received by the microphone 40 are converted to digital signals and stored in the RAM 45 through the amplifier 41, the sound signal processing circuit 42, the record/play-back selection switch 18b, the A/D converter circuit 44 and the digital signal processing circuit 44.

When the sound release switch 53 is turned ON, the sound release switch actuating signals (signals for commencing the recording of the sound signals) are sent to the system controller 23 of the camera body 100 from the system controller 51, and the digital sound signals, which are stored in the RAM 45 with a compressed time base, are read out. The digital sound signals are then converted to analogue signals by the D/A converter circuit 46 and fed to the camera body 100 through the compressed sound signal processing circuit 49 and the connectors 1 and 2.

In the camera body 100, the magnetic disc 12 is rotated at a constant speed by the system controller 23 which receives a start signal of the recording of the sound signals to move the magnetic head 15 to a predetermined track. Thereafter, the sound/image selection switch 9 is switched to the sound side and the record/play-back selection switch 18a is switched to the record side. The FM-modulation circuit 19 and the amplifier 20, etc., stand by to commence the operation. The compressed sound signals inputted from the connector 1 are fed to the magnetic head 15 through the image/sound selection switch 9, the FM-modulation circuit 19, the amplifier 20, and the record/play-back selection switch 18a, and recorded onto a single track of the magnetic disc 12 as FM-modulation signals. Note that the above-mentioned control signals are superimposed and recorded on the sound signals.

N3: Reproduction of Image Signals in the Normal Mode

When a monitor is connected to monitor terminal 8, the connection is detected by the monitor detector 24.

In response to the detection signal, the system controller 23 enables an operator to select the play-back mode.

Consequently, when an operator actuates the mode switch 28, the play-back mode can be selected. In the play-back mode, when the power switch 27 is turned ON, the magnetic disc 12 is rotated at a constant speed. When the up-switch 30 and the down-switch 31 are turned ON, the magnetic head 15 is radially moved to increase or decrease the track number, track by track. Consequently, when the image release switch 36b is turned ON, the signals recorded on the associated track are read by the magnetic head 15. The signals are then demodulated by the FM-demodulation circuit 21 through the amplifier 22 and outputted from the monitor terminal 8 through the image signal processing circuit 7. The still picture may be seen if a TV monitor is connected to the monitor terminal 8.

N4: Reproduction of Sound Signals in the Normal Mode

If the signals read from the magnetic disc 12 are sound signals, the sound signals are processed in the sound adaptor 200. When the play-back mode is selected, the play-back mode signals are sent to the system controller 51 from the system controller 23. The system controller 51, which receives the play-back mode signals, switches the record/play-back selection switch 18b to the play-back side to start the play-back of the sound signals.

The sound signals demodulated by the FM-demodulation circuit 21 are inputted to the sound adaptor 200 through the connectors 1 and 2, and converted to the digital sound signals by the A/D converter circuit 44 through the compressed sound reproducing circuit 48 to be stored in the RAM 45. When the sound signals for a signal track are stored in the RAM 45, the digital sound signals with the initial time base are read from the RAM 45. Consequently, the digital sound signals are outputted from the monitor terminal 8 as analogue sound signals through the D/A converter circuit 46, the sound signal processing circuit 50, and connectors 2 and 1. Accordingly, if a speaker (not shown) is connected to the monitor terminal 8 through a monitor amplifier, the sound becomes audible.

AV: Record and Play-Back in the AV mode

The operations in the AV mode will be described below with reference to the flow charts shown in FIGS. 4 and 5.

Figure 4A:
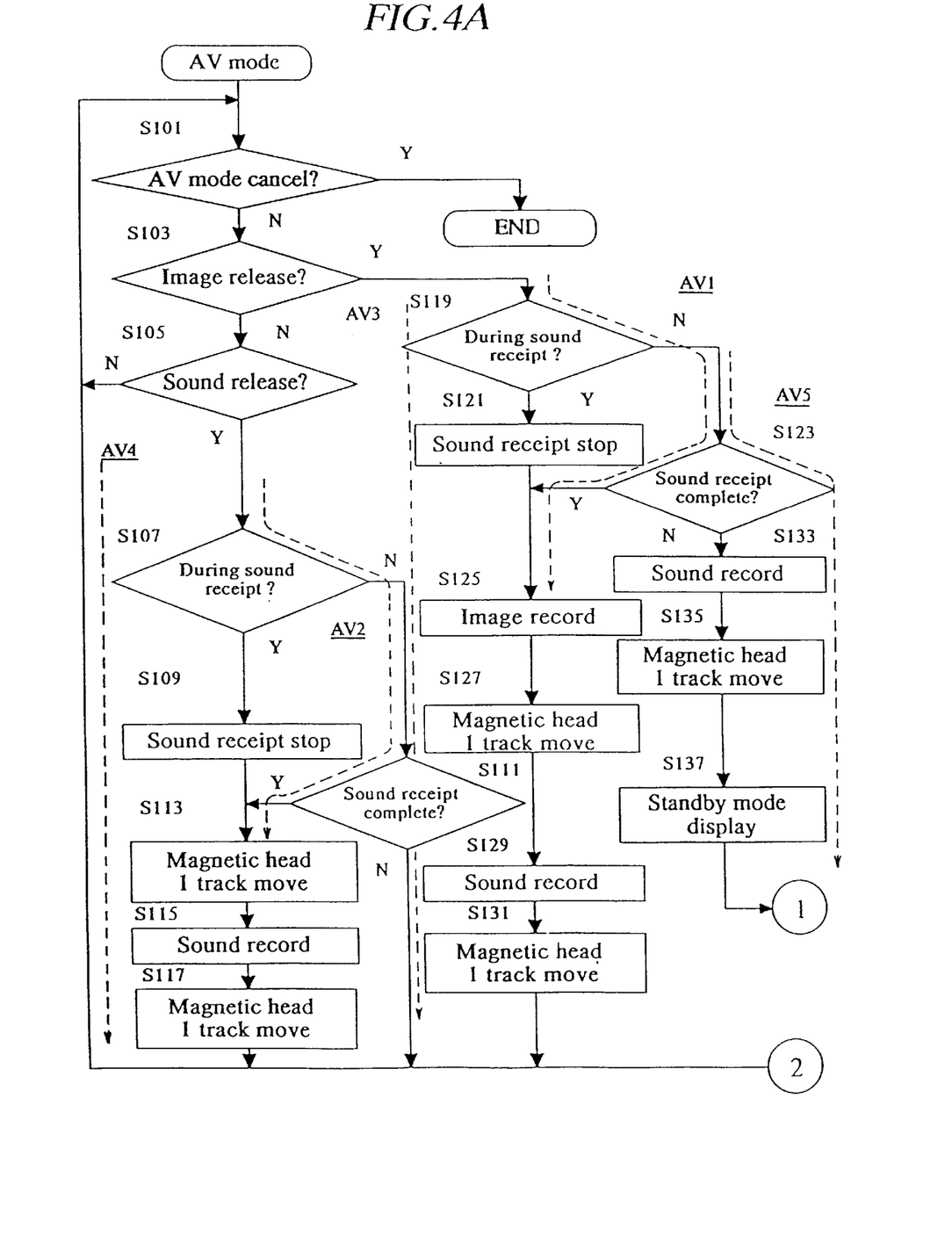
FIGS. 4A, AB and 4C are flow charts of a main operation of a camera body according to the present invention.
Figure 4B:
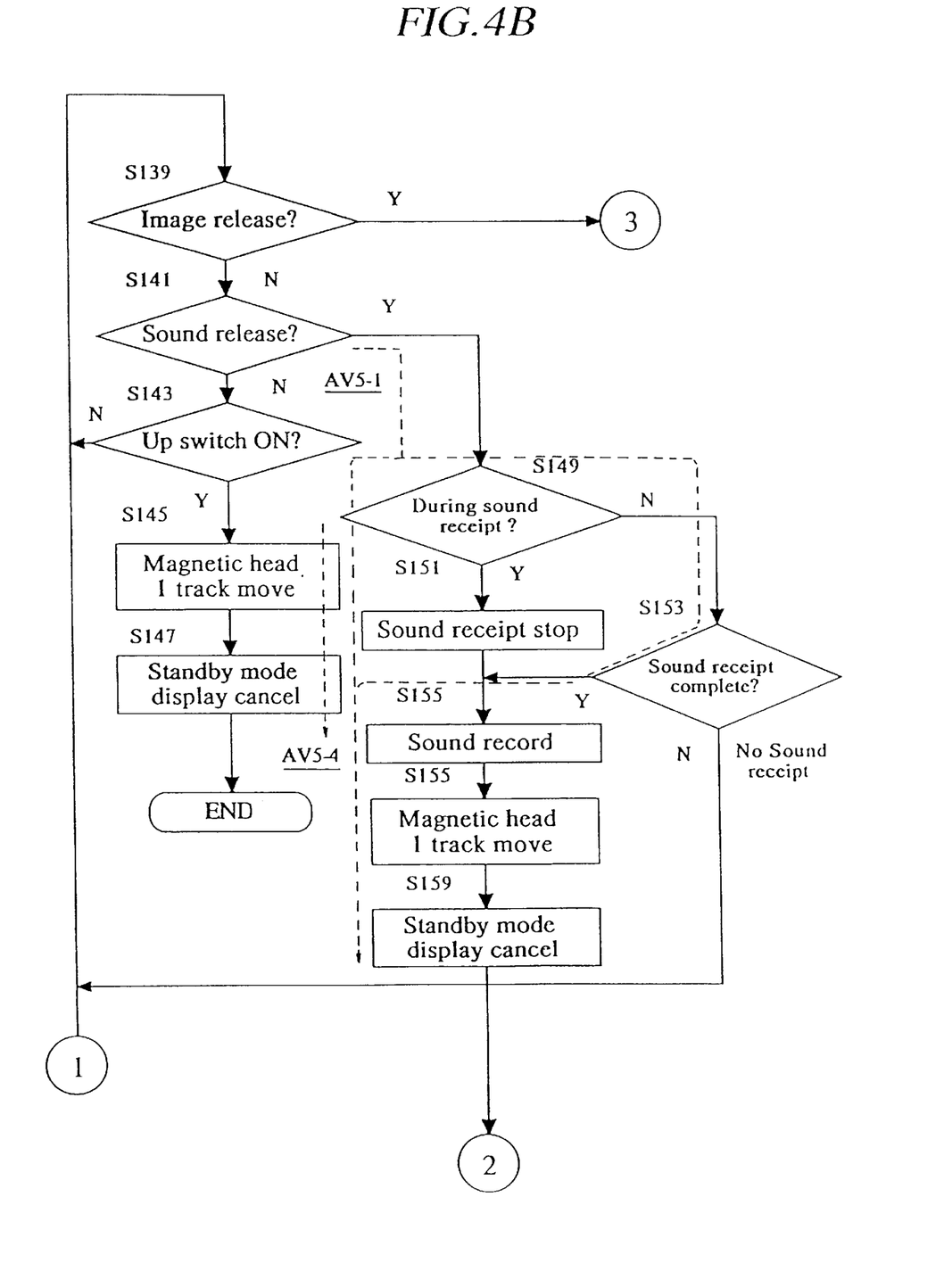
Figure 4C:
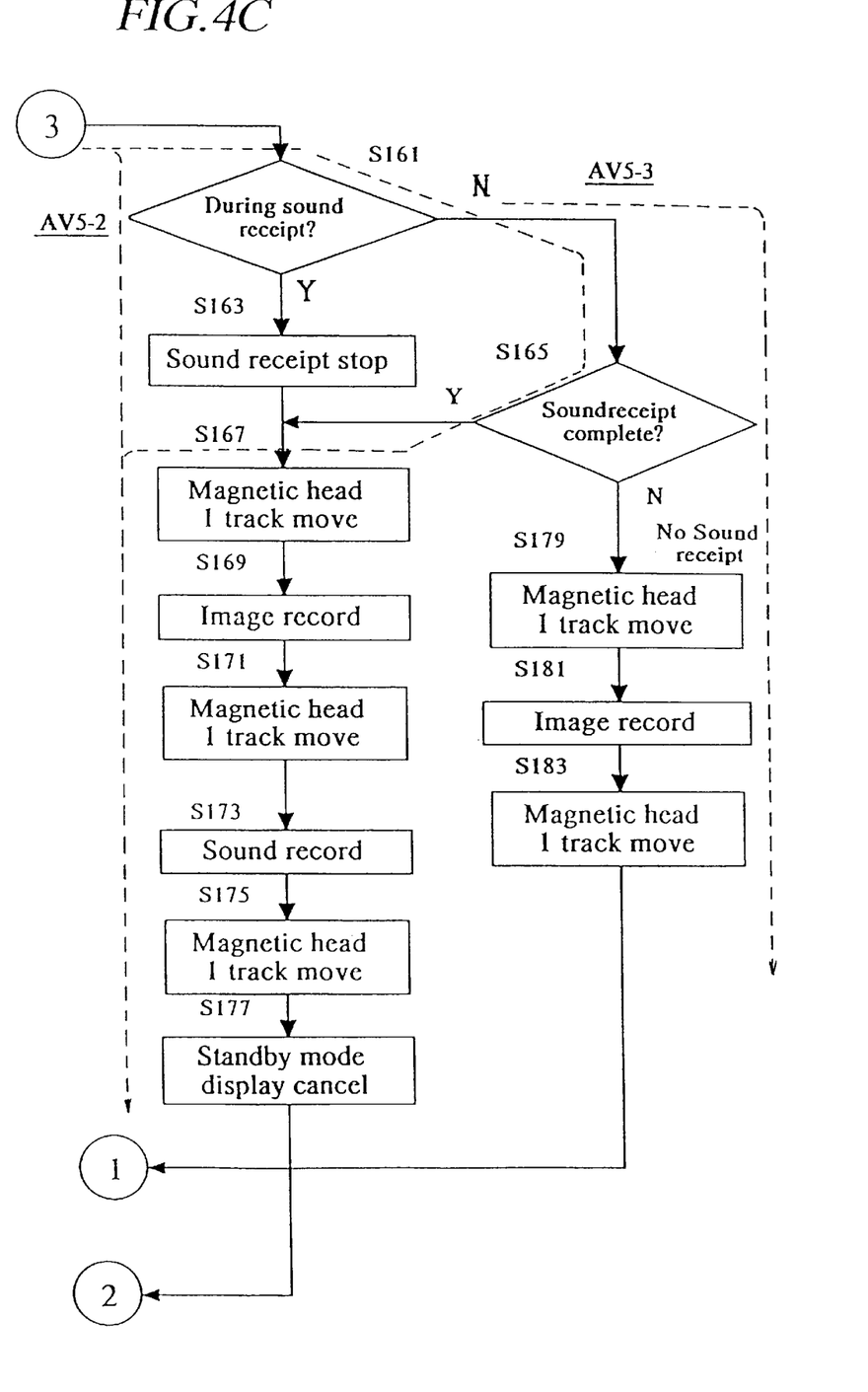
Figure 5A:
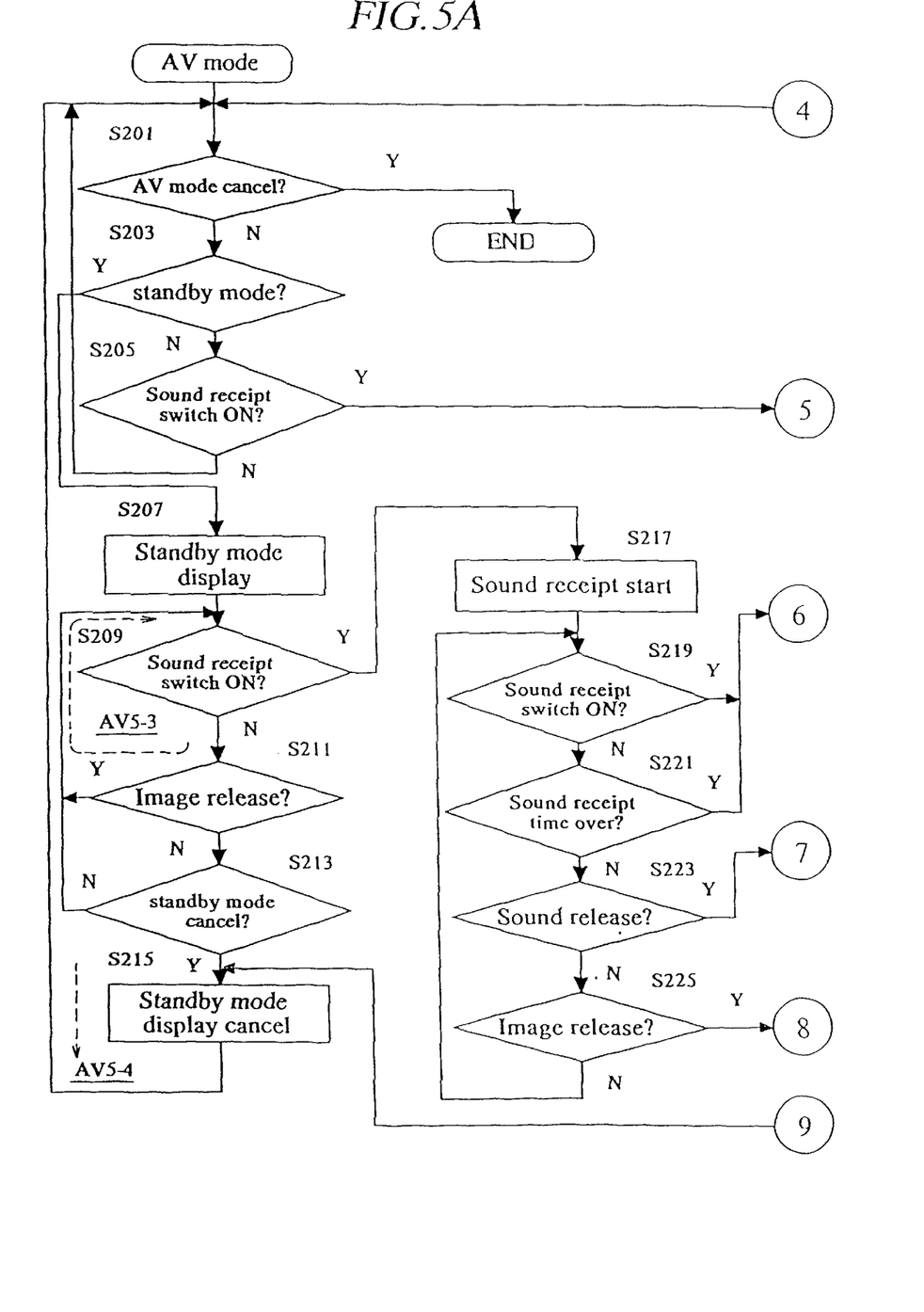
FIGS. 5A and 5B are flow charts of a main operation of a sound adaptor according to the present invention.
Figure 5B:
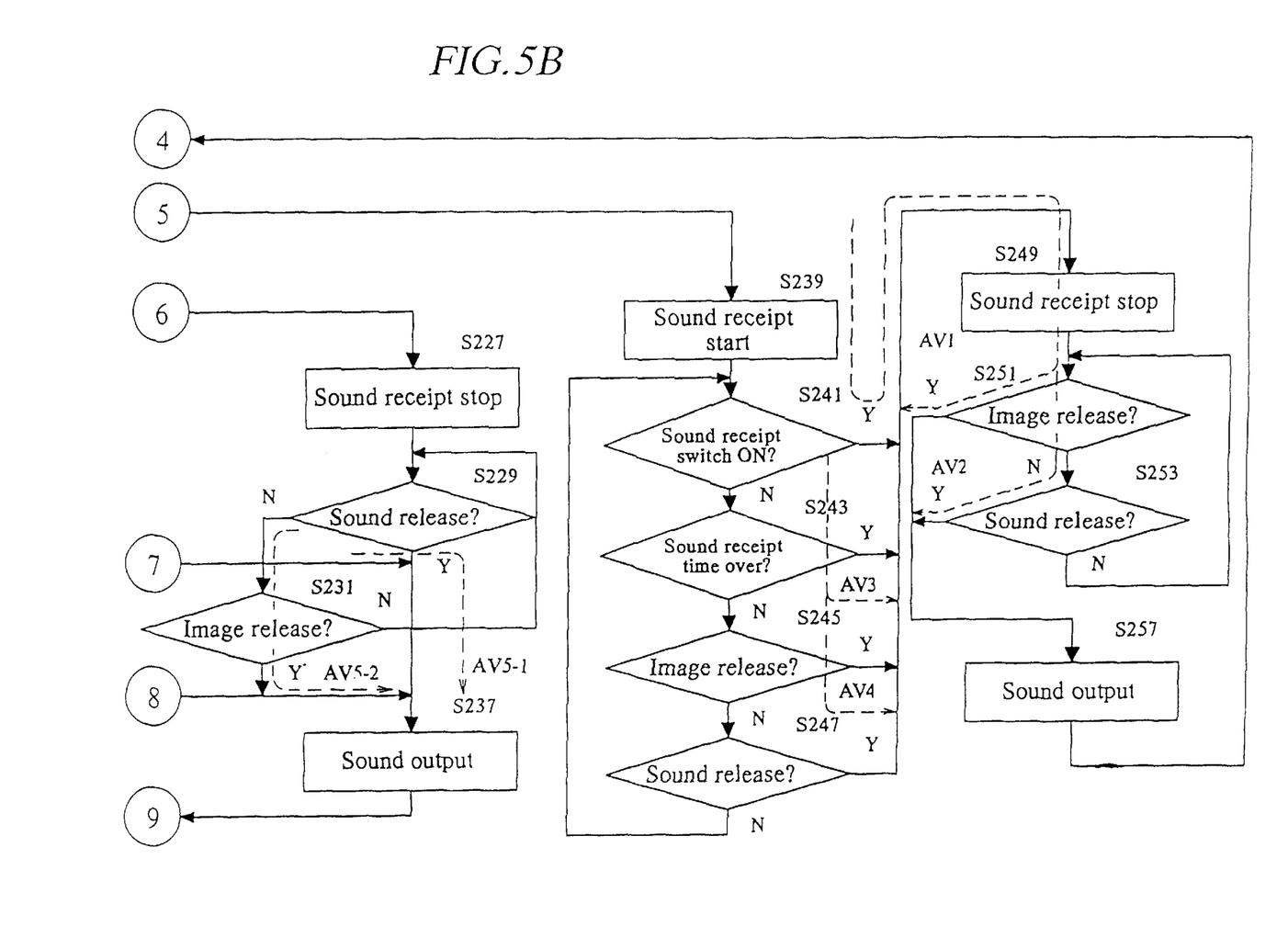

FIGS. 4 and 5 show the operations of the camera body 100 and the sound adaptor 200, respectively. In the flow charts, the portions corresponding to the respective operations discussed below are identified by dotted lines and corresponding letters (e.g., AV1, AV2, AV3, etc.). The sound receiving operation is effected in the sound adaptor 200, and the image pickup operation and the recording of the image and sound signals are carried out in the camera body 100.

The operations in the camera body 100 and the sound adaptor 200 are performed by the system controllers 23 and 51 in accordance with programs stored in internal ROMs thereof.

The necessary data communication is carried out between the system controllers 23 and 51. For instance, when the image release switch 36b is turned ON, the image release actuating signal is sent from the system controller 23 to the system controller 51. When the sound release switch 53 is turned ON, the sound release actuating signal is sent from the system controller 51 to the system controller 23.

In AV mode, the image signals and sound signals are recorded on adjacent tracks of the magnetic disc. Note that the single mode is a mode in which image signals for one field are processed when the image release switch 36b is switched from OFF to ON.

AV1: When Image Release Switch is turned ON after Sound is received by Microphone When the sound receipt starting switch 52 is turned ON, sound signals are received in a predetermined period of time. After the receipt of sound signals is completed, and when the image release switch 36b is turned ON, the image signals are recorded on the tracks as image signals. Thereafter, the received sound signals are recorded on the tracks for the sound signals adjacent to the tracks on which the image signals have been recorded.

Figure 6:
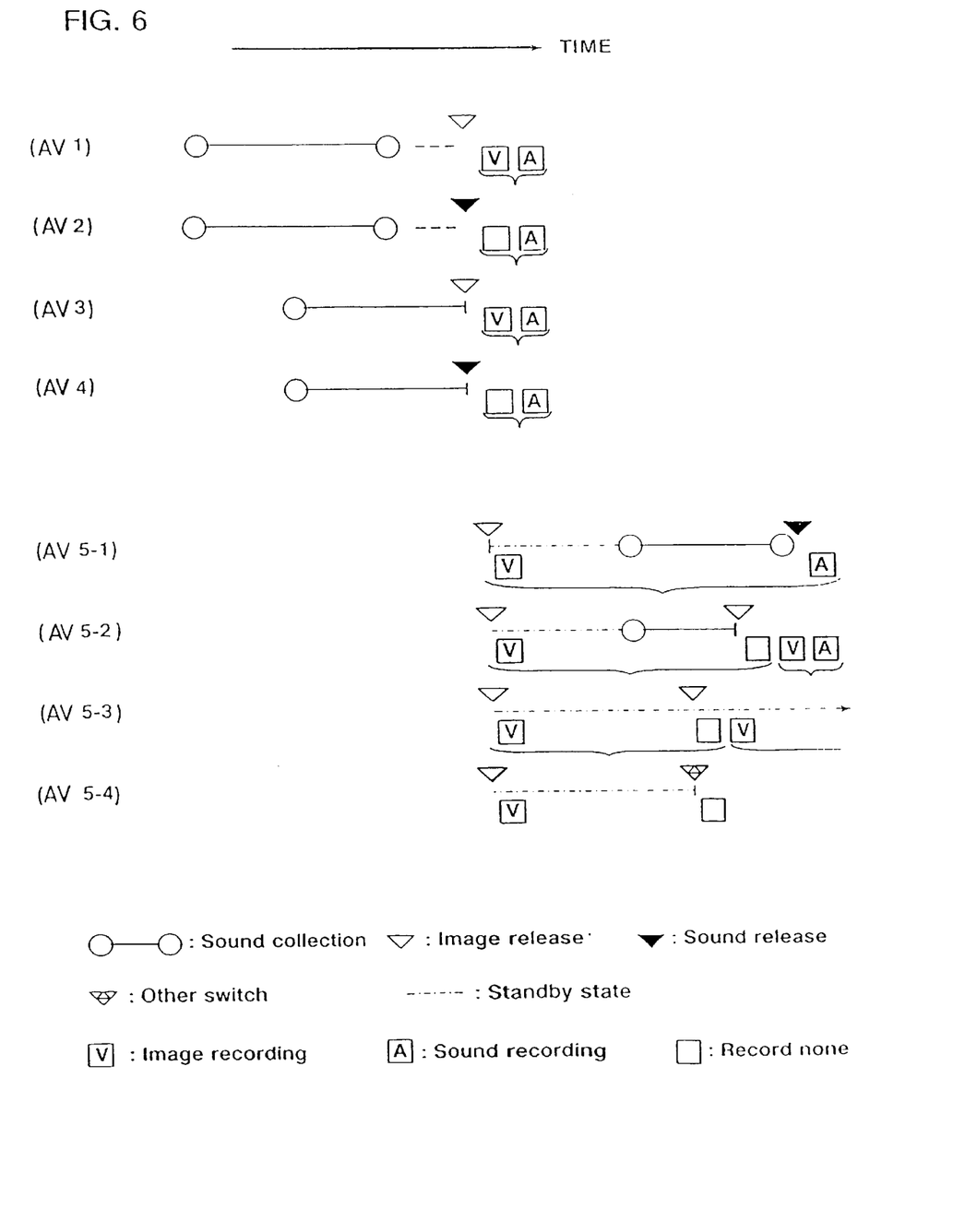
FIG. 6 shows a time charts of main operations of a camera body and a sound adaptor.

The timing chart for the above-mentioned operations is shown at AV1 in FIG. 6. In FIG. 6, "○—○" represents the commencement and completion of the receipt of sound, "V" enclosed in "□" represents the recording operation of the image signals, "A" enclosed in "□" the commencement of the receipt of sound, and "□" no recording. Furthermore, "▽" represents the releasing of the image signals (when the image release switch 36b is turned ON), and "▼" represents the releasing of the sound signals (when the sound receipt starting switch 52 is turned ON).

When the sound receipt starting switch 52 is turned ON, the sound signals within a predetermined period of time are stored in the RAM 45, similar to the operations in the normal mode (steps S201~S205, S239, S241, S243~S247, S249). When the sound signals of the predetermined period of time are stored in the RAM 45, control proceeds to steps S251 and S253. If switch 53 or switch 36b is turned ON, the stored sound signals are outputted to the camera body 100 (step S257).

If the image release switch 36b is turned ON in the waiting state, the system controller 23 checks whether the sound is being stored, or if not, whether the storage of the sound signals is completed (steps S101, S103, S119~S123). If the sound signals are being stored, receipt of the sound signals is stopped (i.e., the image release signal is sent to the sound adaptor 200), and control proceeds to step S125. If the sound signal is neither being received nor stored in the RAM 45, control is directly returned to step S101. If the sound signal is not being received and the storage thereof in the RAM 45 is completed, control proceeds to step S125 (steps S119~S123). The check operation mentioned above will be hereinafter referred to as a "sound receipt check operation."

If the storage of the sound signals is completed, the image signals picked-up by the zoom lens 3 and the image sensor 5 are recorded on the image signal track of the magnetic disc 12 (step S125). When recording is completed, the magnetic head 15 is moved to an adjacent sound signal track of the magnetic disc 12 (step S127). Thereafter, the sound signals stored in the RAM 45 are outputted from the sound adaptor 200 to record the same on the sound signal track of the magnetic disc 12. Thereafter, the magnetic disc 15 is moved to an adjacent image signal track, and control is returned to step S101 (steps S127, S129, S131). In the AV mode, upon recording the sound signals and the image signals, the corresponding sound signal track number and the corresponding image signal track number are recorded in the respective code signals, as mentioned above.

AV2: When Sound Release Switch is turned ON after Sound Signals are received

When the sound release switch 53 is turned ON without turning the image release switch 36b ON after the sound receipt is completed, the magnetic head 15 is moved to an adjacent sound signal track of the magnetic disc 12 to record the received sound signals on the sound signal track (see AV2 in FIG. 6).

This operation will be discussed below with reference to the flow charts shown in FIGS. 4 and 5.

The sound adaptor 200 outputs the sound signals to the camera body 100 when the sound release switch 53 is turned ON in the waiting position following to the completion of the receipt of the sound signals (steps S251~S257).

On the other hand, in the camera body 100, the magnetic head 15 is moved to the image signal track and control does not proceed until the image release switch 36b or the sound release switch 53 is turned ON (steps S101 S105). If the sound release switch 53 is turned ON in the waiting position, the sound receipt is checked (steps S107~S111). Here, since a sound signal is not being received and since the storage of the sound signals is complete, the magnetic head 15 is moved by one track to record the sound signals outputted from the sound adaptor 200 onto the sound signal track (steps S101~S107, S111~S115). Thereafter, the magnetic head 15 is moved by one track and control is returned to step S101 (steps S117, S101~S105).

As can be understood from the foregoing, when sound releasing is effected without effecting image releasing, after the sound signals have been received, the tracks corresponding to the image signals remain blank. In other words, the magnetic head jumps the image signal tracks to record on the sound signal tracks. Accordingly, the image signals can be recorded later on the blank image signal tracks corresponding to the alternating sound signal tracks.

AV3: When Image Release Switch is turned ON during Receipt of Sound Signals

When the image release switch 36b is turned ON during the receipt of the sound signals, the sound receipt is stopped. The image signals are then recorded on the image signal track and the received sound signals are recorded on the corresponding sound signal track (see AV4 in FIG. 6).

This operation will be explained below with reference to the flow charts shown in FIGS. 4 and 5. When the image release switch 36b is turned ON during the receipt of the sound by the sound adaptor 200, the image pickup operation and the checking of the sound receipt are carried out (steps S101~S103, S119~S123). Here, since the sound is being received, the sound receipt stop signal is sent to the sound adaptor 200 so that the sound receipt is stopped (steps S119 and S121). The image signals that have been picked up are then recorded on the image signal track (step S125). Thereafter, the magnetic head 15 is moved to the adjacent sound signal track to record the sound signals outputted from the sound adaptor 200 on the sound signal track (steps S127 and S129). The magnetic head 15 is then moved to the adjacent image signal track, and control is returned to step S101 (step S131).

When the sound adaptor 200 receives the image release signal from the camera body 100 during the receipt of the sound signals, the sound receipt is stopped (steps S245 and S249). Thereafter, the sound signals received before the sound receipt is stopped are outputted to the camera body 100 and the control is then returned to step S201 (steps S251 and S257). The outputted sound signals are recorded on the sound signal track at step S129 mentioned above.

As can be seen from the above discussion, when the image release switch 36b is turned ON during the receipt of the sound signals, the sound receipt is stopped. Accordingly, no noise will occur in the received sound signals due to the release of the image signals. Furthermore, no voltage drop takes place, resulting in high quality sound signals.

AV4: When Sound Release Switch is turned ON during Receipt of Sound Signals

When the sound receipt commences without recording image signals and if the sound release switch 53 is turned ON during the receipt of the sound signals, the sound receipt is stopped and the sound signals received up until then are recorded on the adjacent sound signal track by the magnetic head after having jumped the preceding image signal track (see AV4 in FIG. 6). This operation will be discussed below.

When the sound receipt starting switch 52 in the sound adaptor 200 is turned ON, the receipt of sound signals commences (steps S201~S205, S239~S247). If the sound release switch 53 is turned ON during the receipt of sound, the sound receipt is stopped and the sound signals received are outputted to the camera body 100 (steps S247, S249~S257).

The magnetic head 15 is located above the image signal track of the magnetic disc and waits for the operation of the sound release switch 53 (steps S101~105). When the sound release switch 53 is turned ON, the magnetic head 15 is moved to the corresponding adjacent sound signal track in accordance with the sound release signal from the sound adaptor 200 to record the sound signals outputted from the sound adaptor 200 onto the sound signal track (steps S105, S107, S111 S115). Thereafter, the magnetic head 15 is moved to the next image signal track and waits for the operation of the image release switch 36b or the sound release switch 53 (steps S117, S101~S105).

As can be understood from the above discussion, when the sound release switch 53 is turned ON during the receipt of sound and before the image signals are recorded, the sound receipt is stopped, and the magnetic head jumps the intended image signal track and is moved to the associated adjacent sound signal track to record the sound signals which were received before the sound release switch 53 was turned ON. The image signals can then be recorded later on the blank image signal track.

AV5: When Image Release Switch is turned ON before Receipt of Sound Signals

When the image release switch 36b is turned ON before the sound signals are received, image signals are recorded on the intended image signal track of the magnetic disc 12. Thereafter, the magnetic head 15 is moved to the adjacent sound signal track and the waiting mode is indicated in the LCD panel 37 (steps S101, S103, S119, S123, S133~S137). Control then proceeds to steps S139~S143. This will be referred to as the "sound receipt waiting mode".

The sound adaptor 200 receives the sound receipt waiting mode signal to indicate the sound receipt waiting mode in the LCD panel 51 and waits until the sound receipt starting switch 52 or the image release switch 36b is turned ON, or the sound receipt waiting mode is released (steps S203, S207~S213).

Figure 7:
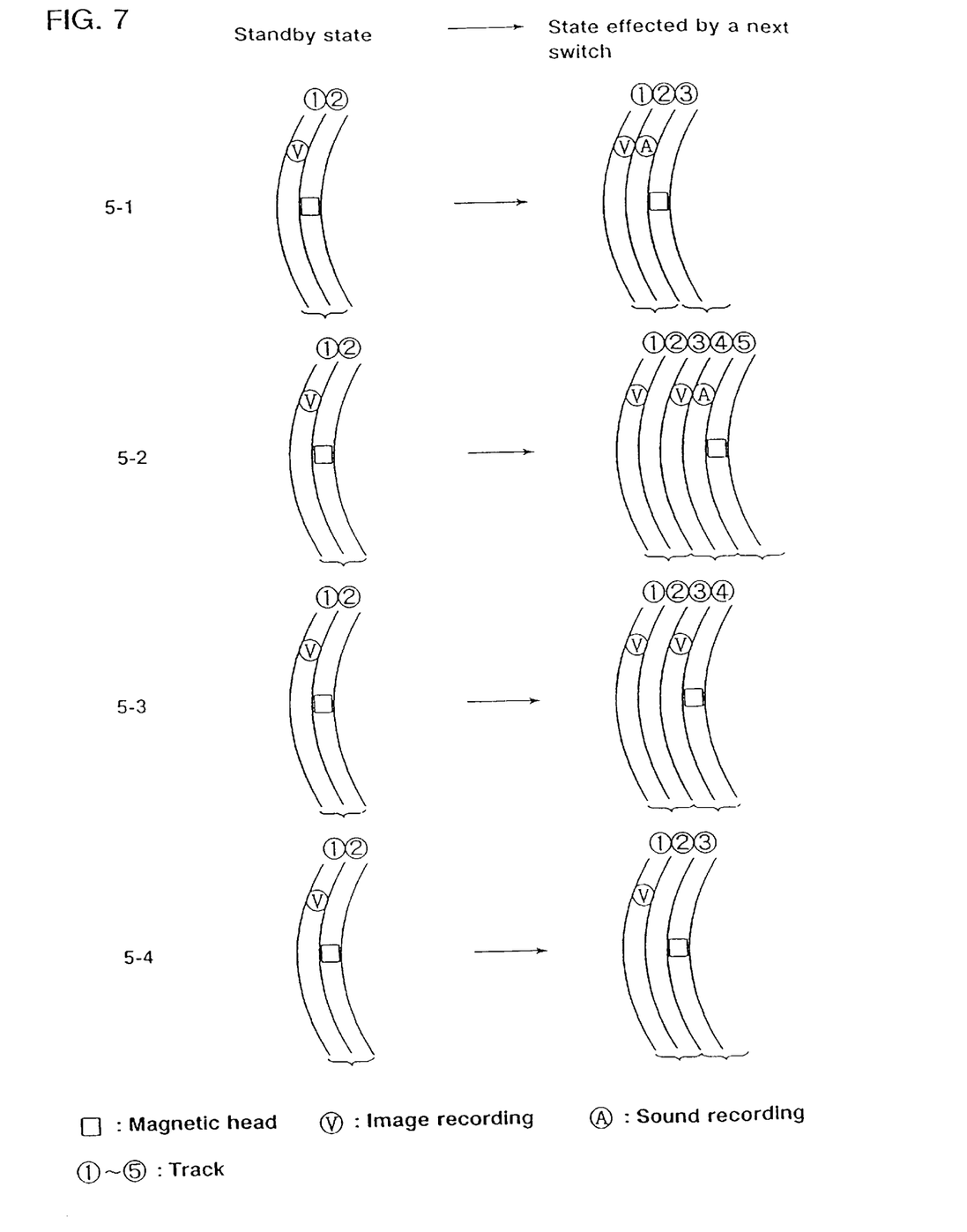
FIG. 7 is a diagram showing positional relationships of tracks of a magnetic disc and a magnetic head in various operations in an AV mode; and, FIGS. 8A and 8B are front elevational views of display surfaces of LCD panels provided in a camera body and a sound adaptor, wherein sound storage waiting modes are indicated, respectively.

In accordance with the operation effected by an operator, four main operations are carried out. These main operations will be described below (see AV5-1~AV5-4 in FIG. 6 and 5-1~5-4 in FIG. 7). In FIG. 7, "①~⑤" designate the track number; "□" designates the position of the magnetic head 15; "V" circled by "○" designates the recording of the image signals; and "A" circled by "○" designates the recording of the sound signals, respectively. In this embodiment, in the AV mode, the sound signals are recorded on tracks which are adjacent to the image signal tracks in the inward radial direction, as shown in FIG. 7.

AV5-1: When Sound Receipt Starting Switch is Turned ON and When Sound Release Switch is Turned ON During or After Receipt of Sound During the receipt of the sound signals, the sound receipt is stopped, and the sound signals received up until then are recorded on the sound signal track (sound signal recording track) ② above which the magnetic head 15 is located in a standby position. Similarly, if the receipt of the sound signals has been completed, the received sound signals are recorded on the sound signal track ②. Thereafter, the magnetic head 15 is moved to the adjacent image signal track (image signal recording track) ③.

When the sound receipt commences after recording the image signals and if the sound release switch 53 is turned ON during the receipt of the sound signals, the sound receipt is stopped and the sound signals received up until then are recorded on the adjacent sound signal track by the magnetic head after having jumped the preceding image signal track (not shown).

The above mentioned operation will be discussed below with reference to the flow charts shown in FIGS. 4 and 5.

Image signals are recorded on image signal track ① and the magnetic head 15 is moved to sound signal track ②. In the camera body 100, whether the sound release switch 53 is turned ON, etc., is repeatedly checked (steps S139~S143). On the other hand, in the sound adaptor 200, when the sound receipt starting switch 52 is turned ON, the sound receipt is effected (steps S209, S217~S229).

In the above mentioned operations, when the sound release switch 53 is turned ON, the received sound signals are outputted to the camera body 100 from the sound adaptor 200. If the sound signals are being received, the sound receipt is first stopped, and then the received sound signals are outputted to the camera body 100. On the other hand, when the sound release switch 53 is turned ON, the system controller 23 of the camera body 100 checks whether the sound signals are received (steps S149~S153). If the sound signals are being received, the sound receipt is stopped. Thereafter, the sound signals sent from the sound adaptor 200 are recorded on sound signal track ② in the waiting position (step S155). Thereafter, the magnetic head 15 is moved to adjacent image signal track ③ and control is returned to step S101 after the sound receipt waiting mode is released (steps S157 and S159).

AV5-2: When Sound Receipt Starting Switch is Turned ON and When Image Release Is Effected During or After Receipt of Sound Signals When the image release switch 36b is turned ON during the receipt of the sound signals, it is assumed that new image signals are recorded. After the sound receipt is stopped, the image signals are recorded on waiting image signal track ③ adjacent to the sound signal track ② and the received sound signals are recorded on the sound signal track ④ adjacent to the image signal track ③ (see AV5-2 in FIG. 6 and 5-2 in FIG. 7). Consequently, as can be seen in 5-2 in FIG. 7, since no signal is recorded on the sound signal track ② corresponding to the image signal track ① on which the image signals have been recorded, the sound signals can be recorded on the blank sound signal track ② at a later time.

The above mentioned operation will be described below in more detail with reference to the flow charts. In the sound adaptor 200, the sound receipt commences upon operation of the sound receipt starting switch 52 and continues until the image release switch 36a is turned ON (steps S201~S205, S239~S247). When the image release switch 36a is turned ON before the sound receipt is completed, the sound receipt is stopped and the sound signals received up until then are outputted to the camera body 100. Then, control is returned to step S201 (steps S245, S249~S257). If the image release switch 36a is not turned ON before the sound receipt is completed, the sound receipt is stopped and control waits for the operation of the release switch 36a or 53 (steps S243, S249~S253). If the image release switch 36a is turned ON, the received sound signals are outputted to the camera body 100. Thereafter, control is returned to step S201 (steps S251 and S257).

Concerning the camera body 100, when the image release switch 36b is turned ON, the system controller 23 checks the sound receipt (steps S139 and S161~S165). If the sound signals are being received, the sound receipt is stopped. Thereafter, the magnetic head 15 is moved to the next image signal track ③ to record the image signals thereon (steps S167 and S169). Thereafter, the magnetic head 15 is moved to sound signal track (sound signal recording track) ④ corresponding to the image signal track ③ to record thereon the sound signals sent from the sound adaptor 200 (steps S171, S173). After that, the magnetic head 15 is moved to adjacent image signal track (image signal recording track) ⑤ and the indication of the sound receipt waiting mode stops. Control is then returned to step S101 (steps S175 and S177).

AV5-3: When Image Release Switch is Turned ON Without Making Sound Receipt Starting Switch ON In this state, the magnetic head 15 is initially located above the sound signal track ② in a waiting position. In this position a sound signal is not recorded, but rather the magnetic head 15 is moved to the adjacent image signal track ③ to record thereon new image signals. Thereafter, the magnetic head 15 is moved to sound signal track ④ adjacent and corresponding to image signal track ③ and the mode becomes the sound receipt waiting mode (see AV5-4 in FIG. 6 and 5-4 in FIG. 7).

The detail of the above-mentioned operations will be discussed below with reference to the flow charts shown in FIGS. 4 and 5.

The sound adaptor 200 repeats the loop of operations of steps S209~S213.

On the camera body side, when the image release switch 36b is turned ON, the sound receipt is checked (steps S139, S161~S165). Here, since the sound signals are neither being received nor have been completed, control proceeds to to step S165 and then to step S179. Namely, the magnetic head 15 is moved to the next image signal track ③ to record thereon the image signals and is then moved to the corresponding sound signal track ④ adjacent thereto. Thereafter, control is returned to step S139 and the mode becomes the sound receipt waiting mode (steps S139~S143).

As can be seen from the foregoing, when the image is picked up without recording the sound, since no signal is recorded on the sound signal track ② corresponding to the image signal track ① on which the image signals by the first pickup are recorded, the sound signals can be recorded later on the sound signal track ②. Furthermore, the image pickup can be continued without releasing the AV mode and without effecting the sound releasing.

AV5-4: When Switch other Than Sound Release Switch and Image Release Switch Is Actuated When a switch other than the release switches 53 and 36b is turned ON, the magnetic head 15 is moved to the next track ③ and the sound receipt waiting mode is released (see AV5-4 in FIG. 6 and 5-4 in FIG. 7). The operation in accordance with the operation of the associated switch is performed. In the illustrated embodiment, when the up-switch 30 is turned ON, the magnetic head 15 is moved by one track, and the sound receipt waiting mode is released. Thereafter, control is returned to step S101 (steps S143~S147). Note that the sound receipt waiting mode is not always released by the operation of any switch other than the release switches 53 and 36b. For example, if the photometering switch 36a, which is actuated to take successive pictures in association with the image release switch 36b, is turned ON, the sound receipt waiting mode is not released.

On the sound adaptor side, when the sound receipt waiting mode of the camera body 100 is released, the indication of the sound receipt waiting mode is stopped and control is returned to step S201 (steps S213 and S215).

In the sound receipt waiting mode mentioned above, "REC" and "AV", for example, in the LCD panel 37 of the camera body 100 blink, as shown in FIG. 8A, so that the operator is made aware of the sound receipt waiting mode. Similarly, in the LCD panel 56 of the sound adaptor 200, "REC" and "VIDEO" are lightened and "AUDIO" blinks, as shown in FIG. 8B.

As can be understood from the above discussion, according to the present invention, the following operations, which could not be effected in the prior art, can be effectively carried out:

(1) The sound signals can be recorded at any time after the image signals are recorded, similar to a so-called "after-recording" process;

(2) Even in the sound receipt waiting mode after the recording of the image signals, when the photometering switch 36a is turned ON, new image signals and corresponding sound signals can be recorded; and (3) During or after the receipt of sound signals after the recording of the image signals corresponding to the sound signals, the sound signals can be, independently of the image signals, recorded to correspond to the subsequent image signals to be recorded.

Although the above discussion has been directed to a recording apparatus having a single magnetic head, the present invention is not limited thereto and can be applied to a recording apparatus having two magnetic heads which can effect the tracking for the two adjacent tracks at one time. In this alternative, in the AV mode, one of the magnetic heads is used for recording the image signals and the other magnetic head is used for recording the sound signals, so that when the image release is effected after the sound signals are received, no movement of the magnetic heads is necessary. Furthermore, it is possible to simultaneously record the image signals and the sound signals without moving the magnetic heads by providing FM modulation circuits 19 for driving the respective magnetic heads and amplifiers 20.

As can be understood from the foregoing, according to the present invention, when the image release is effected during the receipt of sound the AV mode, the receipt of sound is stopped, and the sound signals received immediately before the image release are recorded after the image signals picked up at the image release are recorded, and accordingly, the sound signals are not subject to noise or voltage drop which would be produced upon the image releasing.

Furthermore, if the image release is effected before the sound signals are received, the image signals are recorded, and the mode is switched to a sound receipt waiting mode in which the received sound signals are recorded on the track of the magnetic disc corresponding to the image signals when the sound receipt starting switch is turned ON. Consequently, the necessary sound signals can be recorded any time after the image signals are recorded in the AV mode without modifying the mode.

Furthermore, if a switch other than the release switch is actuated in the sound receipt waiting mode, the operation of that switch has a priority. In this state, if the sound receipt waiting mode is released, the next image signals and sound signals can be recorded in the AV mode without changing the mode.

We claim:

1. A method for recording signals on a recording medium of an electronic still video apparatus having an audio visual record mode for recording image signals at image data locations of the recording medium and for recording sound signals at sound data locations of the recording medium, the image signals and the sound signals being recorded to be associated with one another, the method comprising:

receiving sound signals for up to a predetermined period of time in response to actuation of a sound receipt operation;

receiving image signals, the received image signals being recorded as an associated image signal when an image release operation is effected, actuation of the image release operation completing the sound receipt operation; and recording the received sound signals as an associated sound signal at a sound data location on the recording medium associated with an image data location of the recorded received image signals, the recording of the received sound signals taking place immediately after the completion of the image release operation.

2. The method of claim 1, further comprising:

positioning a recorder of the electronic still video apparatus at a location for recording image signals;

positioning the recorder at a location for recording sound signals associated with the image data location after the received image signals are recorded; and effecting the recording of received sound signals without the sound release operation being effected.

3. The method of claim 2, further comprising:

positioning the recorder at a location for recording image signals which is not associated with the sound data location of the recorded received sound signals after the received sound signals are recorded.

4. The method of claim 1, wherein the recording of signals on the recording medium comprises recording image signals and sound signals on adjacent tracks of a magnetic disk in the audio visual record mode.

5. The method of claim 1, further comprising:

positioning the recorder at a location for recording image signals when the audio visual record mode is initially selected.

* * * * *